C. A. DUNCAN.
COMBINATION CALIPER GAGE.
APPLICATION FILED MAR. 2, 1907.
898,565.
Patented Sept. 15, 1908.
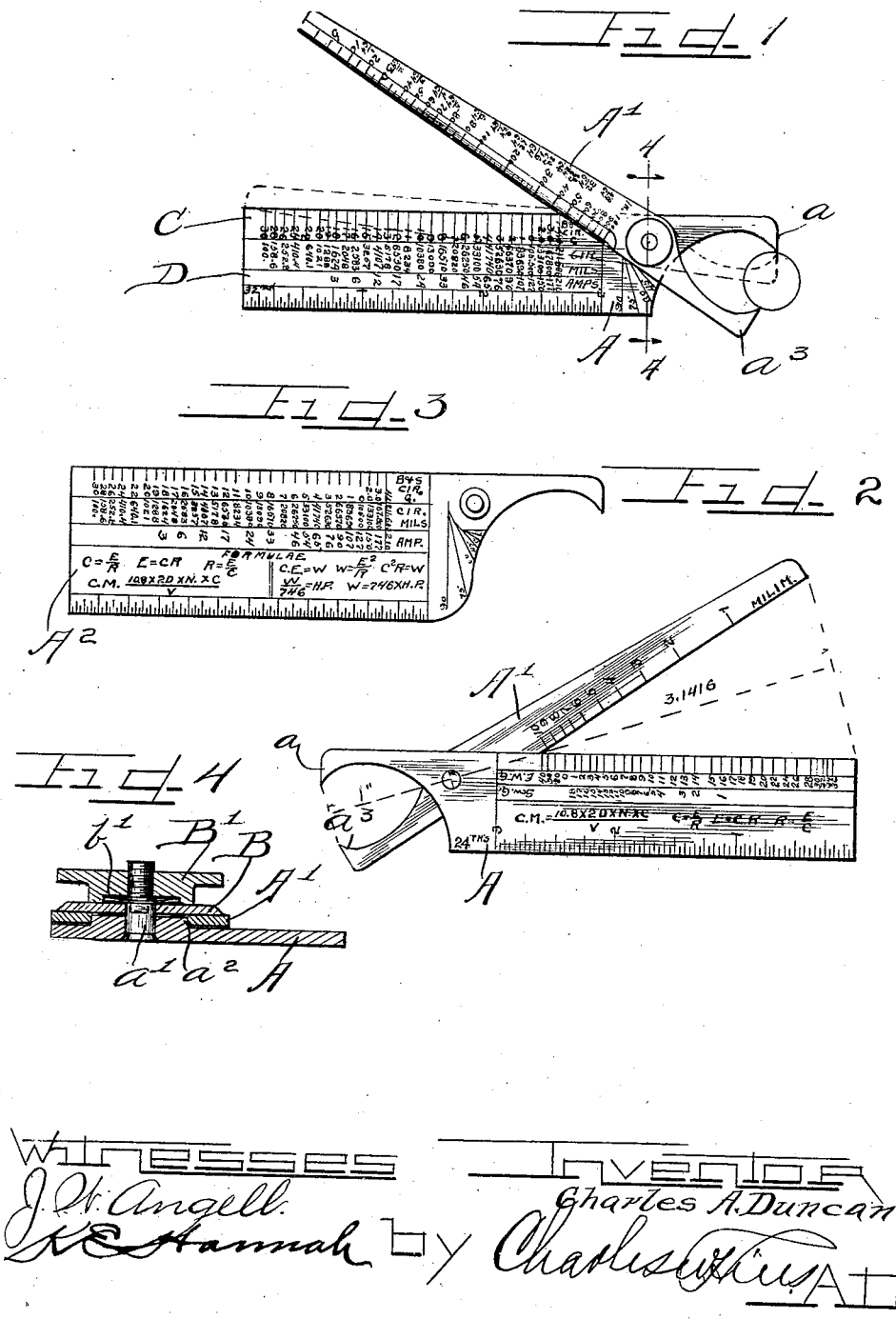

UNITED STATES PATENT OFFICE.

CHARLES A. DUNCAN, OF SPOKANE, WASHINGTON.

COMBINATION CALIPER-GAGE.

No. 898,565.  Specification of Letters Patent.  Patented Sept. 15, 1908.

Application filed March 2, 1907. Serial No. 360,274.

*To all whom it may concern:*

Be it known that I, CHARLES A. DUNCAN, a citizen of the United States, and a resident of the city of Spokane, in the county of Spokane and State of Washington, have invented certain new and useful Improvements in a Combination Caliper - Gage; and I do hereby declare that the following is a full, clear, and exact description of the same, reference being had to the accompanying drawings, and to the letters of reference marked thereon, which form a part of this invention.

This invention relates to improvements in combination caliper and gages and is shown more particularly as a combination caliper and gage for electricians though obviously adapted for any purpose for which wire or screw and certain other gages may be required.

Heretofore it has been usual for electricians and others using wire, screws and the like to provide themselves with various gages whereby measurement of the wire or of screws may be effected. Such gages may show diameter, circular mils. or cross sectional area and any of the standard scales and gages. These are numerous and usually constitute each a separate tool, in consequence many of such tools or gages are usually required to enable the various determinations to be made.

The object of this invention is to combine in a single tool a caliper gage forming in effect a micrometer adapted for use in such restricted spaces that ordinary gages cannot be used, and whereby all the necessary or desirable data may be determined with accuracy and at one reading.

It is further an object of the invention to afford a simple protractor and to provide standard linear scales and such formulæ as it may be desirable to combine in a single tool.

The invention consists of the matters hereinafter described and more fully pointed out and described in the appended claims.

In the drawings: Figure 1 is a face view of a device embodying my invention showing its application and use. Fig. 2 is a similar view of an opposite face of the same. Fig. 3 is a view of one of the scale blades showing the same of increased width. Fig. 4 is an enlarged section on line 4—4 of Fig. 1.

As shown in the drawings: A indicates a scale blade as shown of considerable width and extended at one edge to form a jaw $a$, the point of which extends transversely toward the opposite edge of the blade. Extending through said blade to afford a pivot and dividing the blade into arms the length of which are in the ratio of 1:3.1416—is a screw $a'$, surrounding which on said blade is a circular boss $a^2$ which tapers slightly towards its outer end. The blade $A'$ is of the same length as the blade A and is provided with an aperture complemental with the boss $a^2$ near its outer face and fits thereon. Said blade tapers from said pivot toward the scale end, and on the opposite end beyond said pivot is provided with an integral jaw $a^3$ adapted to coact with the jaw $a$ and to contact the same when the inner edges of said blades at the other extremity meet as shown in dotted lines of Fig. 1. A washer B engages over said pivot screw $a'$, which is flattened to hold said washer from rotation, and threaded on the outer end of said pivot screw is a nut B' whereby said blades may be rigidly engaged together or released to permit relative movement. As shown said nut is provided with a central recess on the inner side adapted to receive a spring washer $b'$ whereby some pressure is at all times maintained on the washer when the nut is retracted. Said blade $A'$ is shaped to afford a relatively thin edge adjacent the edge of the scale A and from the extremity of the inner edge of said blade is accurately graduated toward the pivot to indicate the diameter of wire, screws or other bodies engaged between the jaws $a$ and $a^3$. Said graduations being so arranged at the edge of said scale that the appropriate marking or graduation thereon will coincide with the edge of the blade A when a wire or object of that diameter is engaged in the jaws. The graduations at said inner edge are in thousandths of an inch and as shown also the outer edge of the blade on the outer face thereof is graduated in 64ths of an inch.

The blade A is lined longitudinally to afford a plurality of longitudinal columns and graduated transversely of the side corresponding with the thousandths scale on the blade A' and in the first longitudinal column is marked to indicate B and S circular gage. The scale adjacent thereto indicates circular mils., the next National Code ampers carrying capacity and the outer along the edge affords a three inch scale marked in 32nds of an inch. As shown also the end of the blade adjacent the pivot, is marked or graduated to afford a protractor whereby the blade A′ may be arranged to any desired angle relatively the edge of the blade A.

As shown in Fig. 2, the opposite face of the blade A′, adjacent the blade A is graduated as before described to indicate diameters in the metric scale and the adjacent edge of the corresponding side of the blade A, is graduated to indicate the English wire gage, and the screw gage which are indicated in parallel columns thereon. As heretofore described the outer edge of the scale A, as shown is graduated in 24ths of an inch. As shown also space is afforded for any formulæ thereon desirable or useful for those for whom the scale is particularly intended. For example scales intended for the use of electricians may be marked to indicate various electrical formulæ as shown in Figs. 2 and 3 in the latter of which the blade or scale $A^2$ as shown is made of somewhat greater width than the blade A, should it be desired to indicate many formulæ thereon.

The operation is as follows: A piece of wire to be gaged is inserted between the jaws $a$ and $a^3$ and the same closed down thereon as is usual with calipers, thus causing the blades A and A′ to assume an angle relative to each other dependent upon the diameter of the object engaged between the jaws. By reference to the scales marked on the blade A′ and referring to the graduation coinciding with the edge of the blade A the diameter may be correctly determined and read either in thousandths, or in 64ths of an inch or millimeters by scales on the blade A′. In the same manner the size of the wire may be read on the B and S gage by noting the graduation of said scale which extends to the point of intersection between the inner edges of the blades A′ and A and in the same manner the circular mils. and ampers carrying capacity may be determined. The English wire gage and screw gage are of course used in the same manner and any or all these readings may be made at one inspection.

The linear scales are used as such scales usually are and other scales may be provided if desired and while electrical formulæ are shown marked upon the blades A, $A^2$, of course other formulæ may be used if desired and other scales employed. The jaws may of course be provided with adjusting screws but these are not essential as the instrument must always be in adjustment when the jaws meet and the inner edges of the blades coincide at its opposite extremity. While it is not essential that the length of the blades on opposite sides of the pivot are in a ratio of 1 to pi. It is very convenient inasmuch as the distance between the extremities if measured will then correctly indicate the circumference of any cylindric body calipered.

Of course details of construction of the tool, and the arrangement of the scales may be varied without departing from the principles of this invention.

I claim as my invention:

1. A combined tool embracing a caliper comprising pivotally connected jaws, a blade integral with each jaw and extending beyond the pivot, and scales marked on each and indicating at the intersection of the edges of the blades the measurements of the object calipered.

2. A combined tool embracing a caliper comprising pivotally connected jaws, a blade integral with each jaw projecting oppositely therefrom, beyond the pivot and graduated to gage the objects calipered, said graduations reading at the points of intersection of the edges of the blades.

3. A combined tool embracing a caliper comprising pivotally connected coacting jaws, a blade integral with each jaw projecting oppositely therefrom beyond the pivot, and graduated to mark the dimension of the object calipered, a plurality of scales also graduated to gage the same, all said graduations reading at the intersection of the edges of the blades.

4. A combined tool embracing a caliper comprising pivotally connected jaws, a blade integral with each jaw and projecting oppositely therefrom beyond the pivot and marked to gage and measure the object calipered at the intersection of the edges of the blades and a protractor scale on one of said blades in position for the other blade to coact therewith in measuring angles.

5. A caliper embracing graduated blades pivoted to afford coacting jaws at one end, said graduations reading at the intersection of the edges of the blades the diameter of the object calipered in thousandths and sixty-fourths of an inch and in millimeters along the adjacent edges thereof and a linear scale along one of the opposite edges of one of said blades.

6. A caliper embracing graduated flat blades pivoted to afford coacting jaws at one end said graduations reading from the other end of the blades toward the pivot and at the intersection of the blades indicating the size and gage of the object between the jaws and one or more linear scales along the opposite edges of said blades.

7. A caliper embracing blades graduated to afford pivoted jaws of a length compared with the remainder of the blade in the ratio of 1:3.1416, said blades beyond the pivot being graduated to indicate at the intersection of the blades diameter, B and S circular gage, circular mils. and English wire gage of a wire engaged between the jaws.

8. A caliper embracing blades graduated to afford pivoted jaws of a length compared with the remainder of the blade in the ratio of 1:3.1416, said blades beyond the pivot being graduated to indicate diameter, B and S circular gage, circular mils. and English wire gage of a wire engaged between the jaws, said graduations and gages reading at the intersection of the adjacent edges of the blades and one or more linear scales along the opposite edges of said blade.

9. A caliper embracing blades graduated to afford pivoted jaws of a length compared with the remainder of the blade in the ratio of 1:3.1416, said blades beyond the pivot being graduated to indicate diameter, B and S circular gage, circular mils. and English wire gage, of a wire engaged between the jaws, said graduations and gages reading at the intersection of the adjacent edges of the blades, one or more linear scales along the opposite edges of said blades and formulæ marked on one of said blades.

10. In a device of the class described two pivotally connected blades the adjacent ends thereof on one side the pivot affording a caliper said blades on the opposite side of the pivot having a length relative the caliper ends of 3.1416:1 and graduated to indicate at the intersection of the arms by a plurality of scales the diameter of a wire engaged between the jaws, said graduations extending across one of said blades and indicating also B and S circular gage, circular mils. and ampere carrying capacity, a protractor marked on one of said blades with references to the pivot thereon as a center to indicate the angle of divergence of said blades, formulæ marked on said blade and linear scales on the outer edges of said blade.

11. A caliper gage comprising coacting pivotal jaws adapted to engage the object calipered therebetween and blades extending on the opposite side of the pivot from said jaws, one having a beveled edge, which, with one of the edges of the other blade is adapted to simultaneously indicate B and S circular gage, ampere capacity, and diameter of an object engaged between the jaws.

12. A device of the class described comprising jaws and blades integral therewith, one of which is beveled on one edge and at the intersection with the adjacent edge of the other blade adapted to measure B and S circular gage, circular mils., diameter, screw gage and English wire gage of an object engaged between the jaws at one setting thereof and linear scales on said blades.

13. A device of the class described embracing jaws adapted to engage the object to be measured and blades on the opposite side of the pivot from said jaws indicating simultaneously at the intersection of the edges of the blades a plurality of measurements of the object engaged between the jaws.

14. In a device of the class described the combination with pivotal jaws and blades extending oppositely therefrom beyond the pivot for said jaws and coacting therewith to indicate at the intersections thereof a plurality of measurements of an object engaged between the jaws and for a single adjustment of the jaws.

15. In a caliper gage the combination with pivotal blades, one of which has its measuring edge beveled of jaws integral therewith extending on the opposite side of the pivot adapted to engage therebetween the object calipered and measured by the blade, said blades indicating at the intersection of the beveled edge with the edge of the other blade diameter, B and S circular gage, circular mils., ampere capacity and English wire gage simultaneously and for one setting of the gage and linear scales thereon.

16. In a caliper gage coacting jaws for engaging therebetween the object to be calipered, blades integral therewith adapted to indicate at the intersections thereof at each setting diameter in decimals and fractions of an inch, of an object engaged between the jaws, one of the blades having a protractor scale thereon and the other blade adapted to coact therewith for measurement of angles.

17. In a device of the class described the combination with blades pivoted together, of jaws secured thereto extending on the opposite side of the pivot, adapted to engage an object therebetween, said blades indicating at the intersections of the edges thereof at each setting diameter in fractional and decimal parts of an inch and in millimeters, B and S circular gage, circular mils., ampere carrying capacity, British wire gage and screw gage of the object engaged between the jaws and linear scales on said blades.

In testimony whereof I have hereunto subscribed my name in the presence of two subscribing witnesses.

CHARLES A. DUNCAN.

Witnesses:
J. W. ANGELL,
K. E. HANNAH.